(12) United States Patent
Suh et al.

(10) Patent No.: US 10,776,549 B2
(45) Date of Patent: Sep. 15, 2020

(54) METHOD OF MANUFACTURING A SEMICONDUCTOR DEVICE USING THE SAME

(71) Applicants: Samsung Electronics Co., Ltd., Suwon-si (KR); Industry-Academic Cooperation Foundation, Yonsei University, Seoul (KR)

(72) Inventors: Dong Chan Suh, Suwon-si (KR); Mann-Ho Cho, Seoul (KR); Woo Bin Song, Hwaseong-si (KR); Kwang Sik Jeong, Seoul (KR)

(73) Assignees: SAMSUNG ELECTRONICS CO., LTD., Yeongtong-gu, Suwon-si, Gyeonggi-do (KR); Industry-Academic Cooperation Foundation, Yonsei University, Seodaemun-gu, Seoul (KR)

( * ) Notice: Subject to any disclaimer, the term of this patent is extended or adjusted under 35 U.S.C. 154(b) by 13 days.

(21) Appl. No.: 16/266,143

(22) Filed: Feb. 4, 2019

(65) Prior Publication Data
US 2019/0370429 A1 Dec. 5, 2019

(30) Foreign Application Priority Data
May 31, 2018 (KR) .......................... 10-2018-0062432

(51) Int. Cl.
*H01L 21/66* (2006.01)
*G06F 30/39* (2020.01)
(Continued)

(52) U.S. Cl.
CPC ............ *G06F 30/39* (2020.01); *H01L 21/265* (2013.01); *H01L 22/14* (2013.01); *G06F 2119/18* (2020.01)

(58) Field of Classification Search
CPC ..... H01L 21/265; H01L 22/14; G06F 2119/18
(Continued)

(56) References Cited

U.S. PATENT DOCUMENTS 6,661,519 B2    12/2003  Fukasawa
9,599,555 B2    3/2017   Richter et al.
(Continued)

FOREIGN PATENT DOCUMENTS

EP    3156762 A1     4/2017
KR    10-0875873 B1  12/2008
(Continued)

OTHER PUBLICATIONS

Jen, Chih-Yu, "Silicon Doping Profile Measurement Using Terahertz Time Domain Spectroscopy" (2014), Thesis, Rochester Institute of Technology (186 pages).

*Primary Examiner* — Elias Ullah
(74) *Attorney, Agent, or Firm* — Muir Patent Law, PLLC

(57) ABSTRACT

A method for manufacturing a semiconductor device with an improved doping profile is provided. The method includes providing a measuring target including a first region having a plurality of layers, inputting a first input signal into the measuring target and measuring a resulting first output signal, such as a change over time of a first output electric field that is transmitted through or reflected by the first region. Based on a first model including first structural information of a plurality of first modeling layers and information on doping concentrations of each of the plurality of first modeling layers, calculating a second output signal. When a result of comparing the first output signal with the second output signal is smaller than a threshold value, a three-dimensional model of the measuring target may be estimated based on the first model. Such non-destructive measurements may be used to determine manufacturing process parameters corresponding to ideal doping
(Continued)

profiles and used to manufacture semiconductor devices implementing such manufacturing process parameters.

17 Claims, 16 Drawing Sheets

(51) Int. Cl.
  *H01L 21/265* (2006.01)
  *G06F 119/18* (2020.01)
(58) Field of Classification Search
  USPC .......................................................... 438/17
  See application file for complete search history.

(56) References Cited

U.S. PATENT DOCUMENTS

2016/0305995 A1  10/2016  Kim et al.
2017/0102231 A1   4/2017  Yahng et al.

FOREIGN PATENT DOCUMENTS

| KR | 10-1264099 B1 | 5/2013 |
| KR | 10-20160124406 A | 10/2016 |
| KR | 10-1712890 B1 | 3/2017 |

METHOD OF MANUFACTURING A SEMICONDUCTOR DEVICE USING THE SAME

This application claims priority under 35 U.S.C. § 119 to Korean Patent Application No. 10-2018-0062432 filed on May 31, 2018 in the Korean Intellectual Property Office, the disclosure of which is incorporated herein by reference in its entirety.

BACKGROUND

1. Field of the Inventive Concept

The present inventive concept, according to exemplary embodiments, relates to a method for determining a doping concentration of a three-dimensional structure and a method of manufacturing a semiconductor device with improved doping concentration.

2. Description of the Related Art

Recently, semiconductor devices have been miniaturized and their performances have been improved.

In the semiconductor device including the three-dimensional structure, when analyzing a doping concentration, a non-contact method may be used.

SUMMARY

Aspects of the present inventive concept provide a method for determining a doping concentration of a three-dimensional structure capable of estimating the doping concentration of the three-dimensional structure of a measuring target, using calculations provided as a signal in the time domain.

Aspects of the present inventive concept provide a method of manufacturing a semiconductor device as a result of estimating a doping concentration of the three-dimensional structure of a semiconductor device, using calculations provided as a signal in the time domain.

However, aspects of the present inventive concept are not restricted to the one set forth herein. The above and other aspects of the present inventive concept will become more apparent to one of ordinary skill in the art to which the present inventive concept pertains by referencing the detailed description of the present inventive concept given below. According to some embodiments of the present inventive concept, there is provided a method of manufacturing a semiconductor device, the method comprising providing a measuring target including a first region having a plurality of layers; inputting a first input signal, which is a change over time of a first input electric field, into the measuring target, and measuring a first output signal which is a change over time of a first output electric field transmitted through or reflected by the first region; providing a first model including first structural information of a plurality of first modeling layers and information of doping concentrations of each of the plurality of first modeling layers; obtaining a second output signal, which estimates a change over time of a second output electric field transmitted through or reflected by the first model, with the first input signal as an input value to the first model; comparing the first output signal with the second output signal to obtain a comparison value; determining the first model represents the first region of the measuring target in response to the comparison value being smaller than a threshold value; and estimating a three-dimensional structure of the plurality of layers of the measuring target on the basis of the first model.

The three-dimensional structure of the plurality of layers may be estimated from a three-dimensional model, wherein the three-dimensional model is the first model or derived from the first model and includes information on doping concentrations of each of the plurality of layers.

Methods of manufacture may also include manufacturing one or more semiconductor devices with corresponding semiconductor substrates having a doping profile of a corresponding first region determined in response to checking the doping profile of the first region of the first semiconductor substrate.

According to some embodiments of the present inventive concept, there is provided a computer-readable recording medium in which a program is recorded that may be used to determine a doping profile of a semiconductor substrate according to one of the methods described herein as part of manufacturing a semiconductor device.

BRIEF DESCRIPTION OF THE DRAWINGS

The above and other aspects and features of the present inventive concept will become more apparent by describing in detail exemplary embodiments thereof with reference to the attached drawings, in which.

DETAILED DESCRIPTION OF THE EMBODIMENTS

Hereinafter, a method for determining a doping concentration of a three-dimensional structure according to some embodiments of the present inventive concept will be described with reference to FIGS. 1 to 7. Ordinal numbers used herein, such as "first," "second," "third," etc., may be used simply as labels of certain elements, steps, etc., to distinguish such elements, steps, etc., from one another. Terms that are not described using "first," "second," etc., in the specification, may still be referred to as "first" or "second" in a claim. In addition, a term that is referenced with a particular ordinal number (e.g., "first" in a particular claim) may be described elsewhere with a different ordinal number (e.g., "second" in the specification or another claim).

Figure 1:
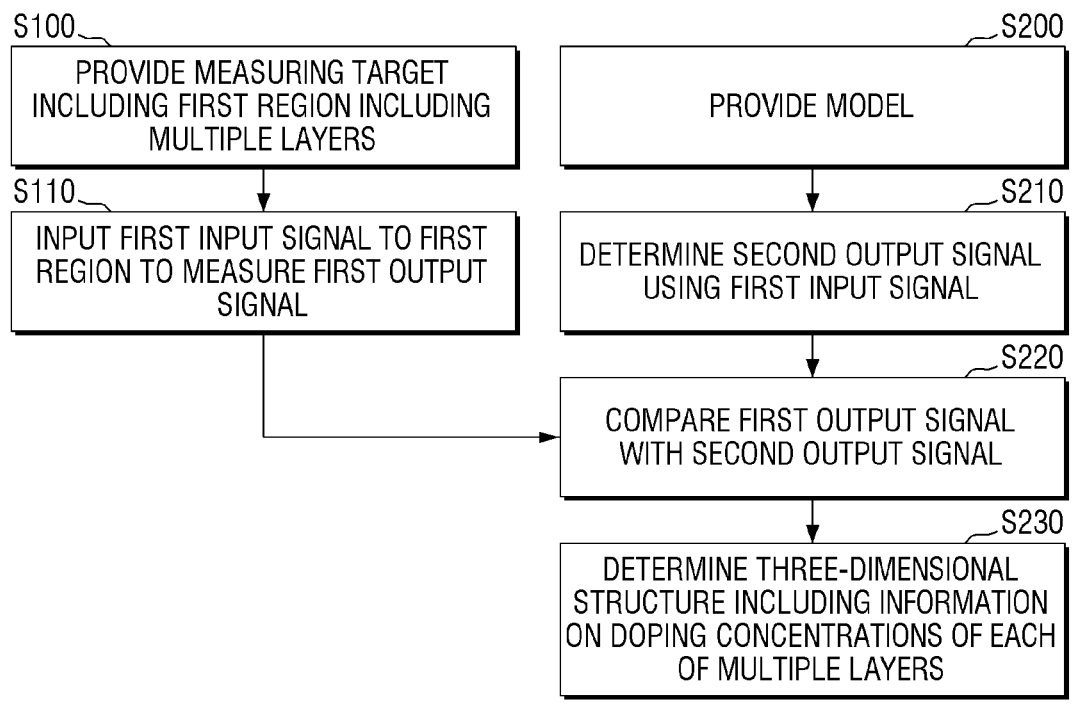
FIG. 1 is a flowchart illustrating a method for determining a doping concentration of a three-dimensional structure according to some embodiments of the present inventive concept.
Figure 2A:
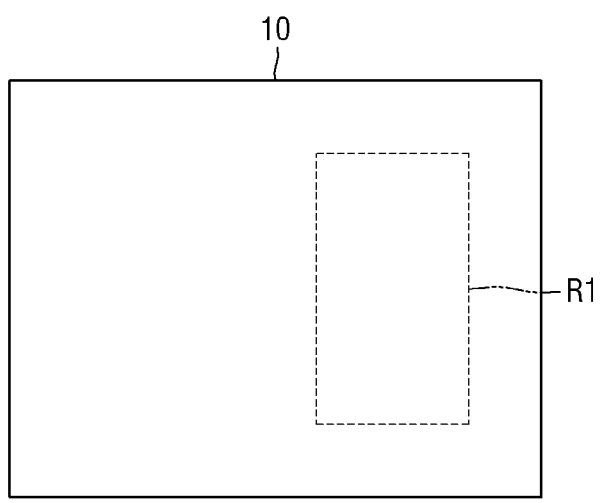
FIG. 2A is a layout diagram for explaining a measuring target in the method for determining the doping concentration of the three-dimensional structure according to some embodiments of the present inventive concept.
Figure 2B:
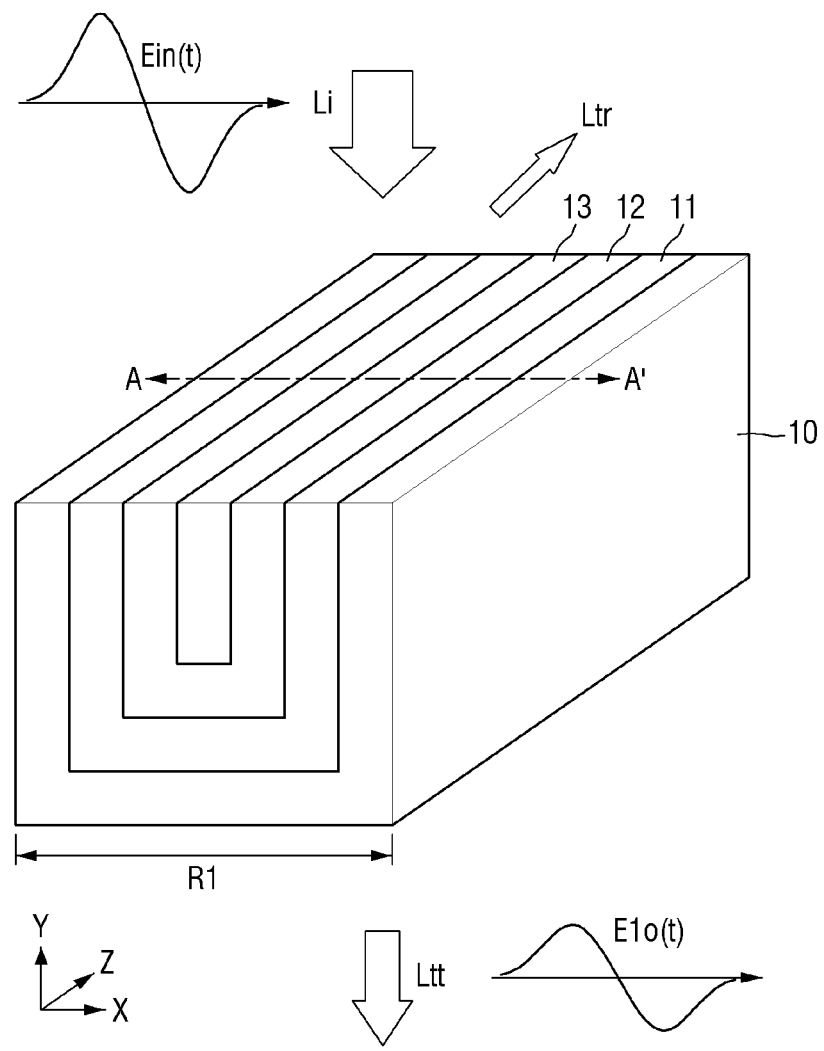
FIG. 2B is a perspective view of a first region of FIG. 2A.

FIG. 1 is a flowchart illustrating the method for determining the doping concentration of the three-dimensional structure according to some embodiments of the present inventive concept. FIG. 2A is a layout diagram for explaining a measuring target in the method for determining the doping concentration of the three-dimensional structure according to some embodiments of the present inventive concept. FIG. 2B is a perspective view of a first region R1 of FIG. 2A.

Referring to FIG. 1, a measuring target may be provided in step (S100). The measuring target may include a first region. The first region of the measuring target may include a plurality of layers. The plurality of layers included in the first region of the measuring target may be stacked on each other.

In step (S110) of FIG. 1, a first input signal is input to the first region of the measuring target and a first output signal may be measured.

The first input signal may be, for example, a change in first input electric field over time. The first input signal may be, for example, a terahertz wave which is an electromagnetic wave having a frequency in the range of 0.01 THz to 10 THz or about 0.01 THz to 10 THz. It will be appreciated that electromagnetic waves may be referenced herein simply as "waves" or "wave".

The first output signal may be, for example, one of a transmitted wave obtained by passage of the first input signal through the first region of the measuring target, and a reflected wave obtained by reflection of the first input signal from the first region of the measuring target. The reflected wave obtained by reflection of the first input signal from the first region of the measuring target may be a wave reflected from, for example, an uppermost surface of the first region of the measuring target. In some examples, both of such transmitted and reflected waves may form the first output signal.

The first output signal may be, for example, a change in the first output electric field with a change over time.

Referring to FIGS. 2A and 2B, the measuring target may have a three-dimensional structure including a plurality of layers. In some embodiments, the measuring target may be a semiconductor device. Semiconductor devices as described herein may be in the form of a semiconductor chip, such as an integrated circuit semiconductor chip forming a memory device, logic device, etc.

The measuring target may include, for example, a base layer 10. The base layer 10 may include a portion in a first region R1.

In this example, a first layer 11, a second layer 12 and a third layer 13 are stacked in the first region R1 on the base layer 10. In the drawings, the first layer 11, the second layer 12 and the third layer 13 are illustrated as being stacked inside a trench of the base layer 10 in a specific shape, but the technical idea of the present inventive concept is not limited thereto. For example, the first layer 11, the second layer 12 and the third layer 13 may be sequentially stacked on the base layer 10 and be patterned in other shapes. Further, the present inventive concept applies to structures having more or less than three layers. It should also be appreciated that reference to layers and stacking of should not imply layers that are formed by sequentially depositing layers one on the other. Nor should reference to layers imply that such layers need be formed from different materials or different process steps. For example, layers 11, 12 and 13 may be formed by ion implantation doping of charge carrier dopants into a semiconductor substrate. For example, layers 11, 12 and 13 may be formed by epitaxially growth in the same epitaxial growth process (e.g., in-situ in the same process chamber without a vacuum break to the chamber) with doping concentrations of the layers changed during the epitaxial growth process (e.g., by changing appropriate precursor concentrations).

The first input signal (Li) may be input to the first region R1 of the measuring target. The first input signal (Li) may be an electric field of an electromagnetic wave and may change over time (Ein(t)). In some examples, the first signal (Li) may be a magnetic field of an electromagnetic wave. In some examples, the first input signal (Li) may be both an electric field and a magnetic field of an electromagnetic wave. It will be appreciated that an electromagnetic wave will have both an electric field component and a magnetic field component and that reference only one of these components as the first input signal (Li) should not be interpreted as suggesting the absence of the other component of the electromagnetic wave.

The first output signal may be a transmitted wave (Ltt) obtained by passage of a portion of the first input signal (Li) through the first region R1 of the measuring target, or a reflected wave (Ltr) obtained by reflection of a portion of the first input signal (Li) from the first region R1 of the measuring target. In some examples, the first output signal may be a dual output signal of both the transmitted wave (Ltt) and the reflected wave (Ltr). The first output signal may have the same unit of measurement of the first input signal (e.g., when the first input signal is an electric field of an electromagnetic wave, the first output signal may be an electric field of an electromagnetic wave). Hereinafter, the first output signal will be described as the transmitted wave (Ltt). However, the same explanation may of course be applied to the reflected wave (Ltr), the dual output signal (Ltt, Ltr) or other output signals.

The first output signal (Ltt) may be a change over time ((E1o(t)) of the corresponding portion of the first input signal (e.g., output electric field and/or magnetic field).

Referring to FIG. 1, a model may be provided to a simulator in step (S200).

The model may include structural information of a plurality of modeling layers, and information on the doping concentrations of each of the plurality of modeling layers. The model may be in the form of data that is stored in memory. The simulator may comprise a computer configured by software to obtain the second output signal as described herein (with respect to step S210, e.g.).

For example, the structural information of the plurality of modeling layers may correspond to the structure of the plurality of layers of the first region of the measuring target, such as a design of the first region of the measuring target. For example, the arrangement of the plurality of modeling layers of the model may be the same as an ideal structure of the plurality of layers in the first region R1 of the measuring target.

In some embodiments, the model may correspond a two-dimensional image. When the model corresponds to a two-dimensional image, the model may provide structural information corresponding only to a cross-sectional view of the first region R1 of the measuring target, such as that shown in FIG. 3.

In some embodiments, the model may correspond to a three-dimensional image. When the model corresponds to a three-dimensional image, the model may include structural information of three dimensions of the ideal structure, such as that corresponding to the perspective view of the first region R1 of the measuring target shown in FIG. 2.

For example, the information of the doping concentrations of each of the plurality of modeling layers may correspond to information of the ideal doping concentrations of each of the plurality of layers in the first region of the measuring target. For example, after executing the doping process on a plurality of layers in the first region of the measuring target, the model may include information of the ideal doping concentration that each of the plurality of layers in the first region of the measuring target should have.

In step (S210) of FIG. 1, an input value corresponding to the first input signal is input to the simulator to obtain a second output signal based upon the model. The simulator may calculate the second output signal based upon the first input signal. In some examples, the simulator may select and provide the second output signal from a lookup table based upon the first input signal. The lookup table may contain a plurality of previously calculated output signals, each of which having been previously calculated using a corresponding different input value and the model (e.g., each having been calculated in a manner as described elsewhere herein with respect to the first input signal and the model). The second output signal may be provide information in the time domain (e.g., information that may be represented in the time domain, such as an electric field intensity over time) The first input signal may be a physical signal which is input to the first region of the measuring target in step (S110). The input value to the simulator in step S210 may represent the physical signal, such as represent the first input signal over time. For example, when the first input signal is an electric field component of an electromagnetic wave, the input value to the model in step S210 may represent an electric field over time (such as intensity of the electric field over time, phase of the electric field over time, and/or intensity and/or phase of one or more polarities of the electric field over time).

The second output signal may represent, for example, one of the transmitted wave determined assuming that at least a portion of the first input signal passes through the model, and the reflected wave determined assuming that at least a portion of the first input signal is reflected from the model. For example, the second output signal may provide intensity and/or phase information represent over time of an expected electric field that may be expected to be output from a device (e.g., transmitted through and/or reflected from) that has the ideal structure of the first region of the target (e.g., ideal doping, ideal shape, ideal size, etc.) when exposed to the first input signal. The intensity information of the second output signal may comprise overall intensity of such an expected electric field and/or intensity of one or more polarities (e.g., intensities of two orthogonal polarities) of such an electric field. The intensity information may also be associated with one or more spatial locations (e.g., different intensities for different locations with respect to the model to account for differences in transmission and reflection angles of the first input signal). The phase information of the second output signal may comprise a relative phase or phase shift of the second output signal with respect to the first input signal, such as with respect to the first input signal when it is transmitted the same distance through air or a vacuum. The phase information may be contained and extracted from an intensity signal representing a value (e.g., electric field) over time. It should be appreciated that "ideal" as used herein may refer to the intended design and need not correspond to an optimum or best design.

When the second output signal represents a reflected wave calculated assuming that a portion of the first input signal is reflected from the model, the second output signal may represent a wave emitted from the uppermost surface of the model (e.g., resulting from reflections from the upper surfaces of the model layers (e.g., from surfaces of first layer 11, second layer 12 and third layer 13)).

The second output signal may represent, for example, a change in intensity and/or phase (such as described herein) of an output electric field over time.

The second output signal may provide information with respect to the time domain. When the second output signal provides information with respect to the time domain, it is possible to obtain one second output signal which varies over time that provides structural information of an entire region of the model including information of the doping concentration. The second output signal may be a function of structure of the entire region, such as a function of a 2D cross sectional region or a function of a 3D region, such as those described herein with respect to region R1. Therefore, the complexity of calculations used or performed by the simulator can be reduced. The second output signal may be calculated using, for example, a finite difference time domain (FDTD) method.

If the second output signal may also be provided in the frequency domain, such as an output electric field intensity per frequency for a plurality of frequencies. For example, the amplitudes and the phases for each frequency domain are obtained.

When the second output signal is provided in the time domain, the second output signal may be obtained using the finite difference time domain method, which may reduce the complexity of calculations.

Figure 3:
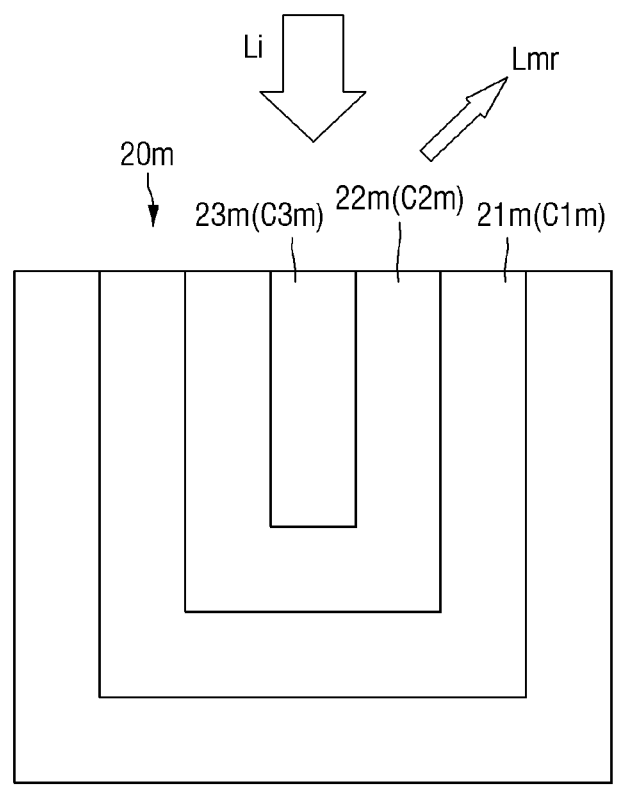
FIG. 3 is a diagram illustrating a first model of the method for determining the doping concentration of the three-dimensional structure according to some embodiments of the present inventive concept.
Figure 4A:
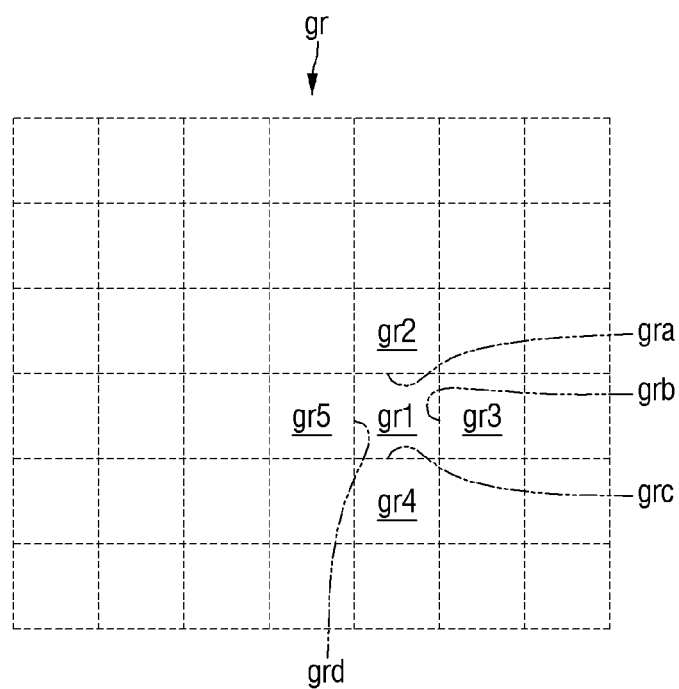
FIGS. 4A and 4B are diagrams for explaining a grid region and a boundary condition of the method for determining the doping concentration of the three-dimensional structure according to some embodiments of the present inventive concept.
Figure 4B:
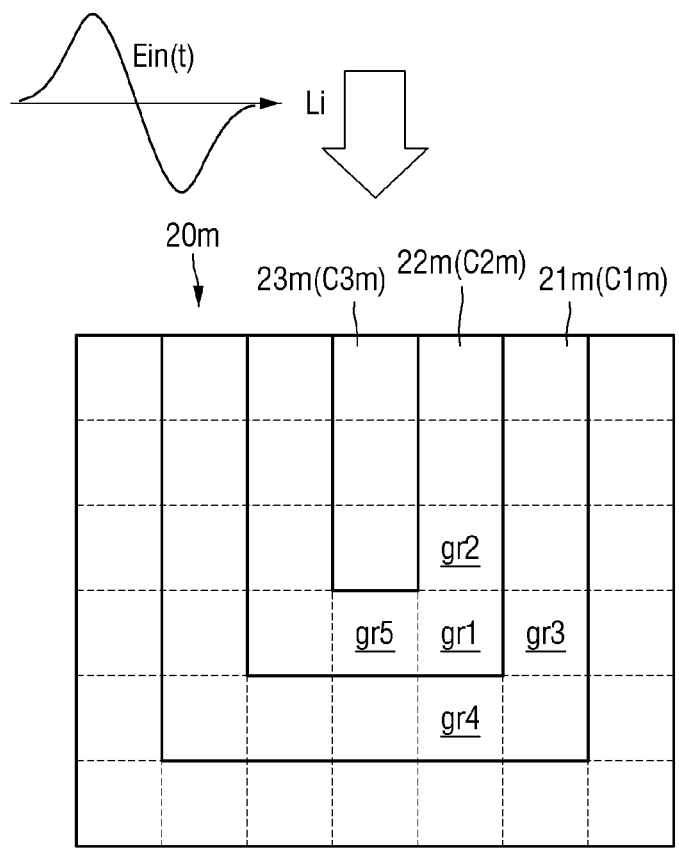

FIG. 3 is a diagram illustrating a first model $20m$ of the method for determining the doping concentration of the three-dimensional structure according to some embodiments of the present inventive concept. FIGS. 4A and 4B are diagrams for explaining a grid region and a boundary condition of the method for determining the doping concentration of the three-dimensional structure according to some embodiments of the present inventive concept.

Referring to FIG. 3, the first model $20m$ may include structural information of a plurality of first modeling layers $21m$, $22m$ and $23m$ (e.g., one or more of material, shape, size, location, and boundaries) and information $C1m$, $C2m$ and $C3m$ of the doping concentrations of each of the plurality of first modeling layers $21m$, $22m$ and $23m$.

The first model $20m$ may include a plurality of first modeling layers $21m$, $22m$ and $23m$. The structural information (e.g., one or more of material, shape, size, location, and boundaries) of the plurality of first modeling layers $21m$, $22m$ and $23m$ may correspond to the structure of the plurality of layers (first to third layers 11, 12 and 13 in FIG. 2B) of the first region of the measuring target (i.e., may represent the ideal structure or intended design of that of the first region of the measuring target).

Information $C1m$, $C2m$, $C3m$ of the doping concentrations of each of the plurality of first modeling layers $21m$, $22m$ and $23m$ may be the ideal doping concentration that each of the plurality of layers (the first to third layers 11, 12 and 13 of FIG. 2B) of the first region of the measuring target (of which the doping concentration may not be known) should have (e.g., an ideal doping concentration determined when designing the semiconductor device). Each of first modeling layers 21m, 22m and 23m may be modeled as having a corresponding constant doping concentration (i.e., each of C1m, C2m, C3m are a corresponding fixed value) and fixed structural information (e.g. formed of the same homogenous material).

As illustrated in FIG. 3, the first model 20m may provide two-dimensional structural information that is limited to locations spaced apart in two dimensions (e.g., corresponding to the two-dimensional illustration of FIG. 3), but the technical idea of the present inventive concept is not limited thereto. For example, the first model 20m may provide three-dimensional structural information (e.g., corresponding to a three-dimensional model). In this example, the arrangement structure of the plurality of first modeling layers 21m, 22m and 23m and the image of the first model 20m corresponds to the arrangement structure of the plurality of layers 11, 12, 13 of the measuring target illustrated in FIG. 2B in the first region R1 of the measuring target. However, according to exemplary embodiments, the following description may also be applied to the case where the first model 20m is a three-dimensional model.

The first input signal (Li) is input as the input value to the simulator. The simulator simulates results of the first model 20m having the first input signal (Li) impinged thereon to obtain the second output signal (e.g., Lmt and/or Lmr), which may be provided in the time domain (e.g., represent changes in Lmt and/or Lmr with respect to time). It will be appreciated the reference to a signal being provided in the time domain refers to information of a value of the signal (e.g., intensity) with respect to time and rather than to a timing of the act of providing such a signal. It should also be appreciated that the first input signal (Li) provided to the simulator and the second output signal estimated by the simulator (e.g., Lmt and/or Lmr) are simulated signals in the form of data to represent the corresponding physical signals described herein. In addition, the first input signal to which the measuring target is exposed (Li) and the first output signal measured as a result thereof (Ltt and/or Lmt) (e.g., as described with respect to S110 of FIG. 1, e.g.) are physical signals. For ease of description, however, such simulated signals may be described in terms of a physical signal (e.g., as a physical signal applied to or obtained from a model as part of a simulation of a simulator, such as with respect to steps S210, S220 and S230 of FIG. 1). Similarly, physical signals described herein may be represented by data to perform various analyses described herein. Similarly, description with respect to models herein (e.g., first model 20m) and components thereof (e.g., layers 21m, 22m and 23m) should be understood in the overall context of this description to refer to information representing such a model and components thereof.

The second output signal may be one or both of the transmitted wave (Lmt) obtained by estimating passage of the first input signal (Li) through the first model 20m, and the reflected wave (Lmr) obtained by estimating reflection of the first input signal (Li) from the first model 20m. For simplicity, in the following description, it is assumed that the second output signal is the transmitted wave (Lmt). However, the same explanation applies equally to the reflected wave (Lmr).

Referring to FIGS. 4A and 4B, the second output signal (Lmt) may be a change over time (E2o(t)) of a second output electric field. That is, the second output signal (Lmt) may be provided in the time domain.

The first model 20m may be divided into a plurality of grid regions (gr). When the first model 20m corresponds to a two-dimensional image, each of the plurality of grid regions (gr) may have, for example, a shape of either a square or a rectangle.

The plurality of grid regions (gr) may include a first grid region gr1, a second grid region gr2, a third grid region gr3, a fourth grid region gr4 and a fifth grid region gr5. The first grid region gr1 may include a first side (gra), a second side (grb), a third side (grc) and a fourth side (grd). The first side (gra) and the third side (grc) may extend in an x direction, and the second side (grb) and the fourth side (grd) may extend in a y direction.

The second grid region gr2 may be a region which is in contact with the first side (gra) of the first grid region gr1. The third grid region gr3 may be a region which is in contact with the second side (grb) of the first grid region gr1. The fourth grid region gr4 may be a region which is in contact with the third side (grc) of the first grid region gr1. The fifth grid region gr5 may be a region which is in contact with the fourth side (grd) of the first grid region gr1. For example, the fifth grid region gr5, the first grid region gr1 and the third grid region gr3 may be disposed along the x direction. The second grid region gr2, the first grid region gr1 and the fourth grid region gr4 may be disposed along the y direction. In this example, the x direction and the y direction are perpendicular to each other in the same plane, and may respectively correspond to horizontal and vertical directions of a semiconductor device (as typically understood, a horizontal direction may lie parallel to the upper surface of a substrate of a semiconductor device, with a vertical direction corresponding to a direction perpendicular to the upper surface of this substrate).

Each of the plurality of grid regions (gr) may include a partial region of (e.g., a part of) at least one of the plurality of first modeling layers 21m, 22m and 23m. Each of the plurality of grid regions (gr) may include only a part of the same modeling layer (e.g., a part of just one of the first layers 21m, 22m and 23m). Some of the boundaries of the grid regions (gr) may correspond to and align with portions of the boundaries between the first modeling layers 21m, 22m and 23m. Each grid region may have be modeled as having a single doping concentration and homogenous structural characteristics (e.g. formed of the same homogenous material).

For example, the first grid region gr1, the second grid region gr2, and the fifth grid region gr5 may only include different portions of the first modeling layer 22m. The third grid region gr3 and the fourth grid region gr4 may only include different portions of the first modeling layer 21m. Some of the boundaries of the grid regions may correspond to those between the first modeling layers 21m, 22m and 23m. For example, as shown in FIG. 4B, grid regions gr1, gr2 and gr5 may correspond to the lower right corner of first modeling layer 22m in FIG. 3 with grid regions gr3 and gr4 corresponding to portions of first modeling layer 21m respectively to the right and below the lower right corner of first modeling layer 22m in FIG. 3. Boundaries grb and grc may thus correspond and align with portions of the boundary between first modeling layer 21m and first modeling layer 22m. Note that while the grid regions gr are shown to be square, other shapes may be used, such as rectangular, hexagonal and/or triangular. Further, the grid regions gr need not all have the same shape or size. For example, grid regions of one of the first modeling layer 21m, 22m, 23m may be larger sized squares or rectangles than grid regions of another one of the first modeling layers 21m, 22m, 23m (which may be helpful to align boundaries of grid regions with boundaries of the first modeling layers 21m, 22m, 23m).

In order to calculate the second output signal (Lmt) in the time domain, a change in the electric field over time may be calculated with respect to the boundaries of each of the grid regions (gr) to obtain the boundary conditions of each of the plurality of grid regions (gr). In this example, each grid region includes four sides and boundary conditions may be calculated for each of the four sides for each of the grid regions (gr). Boundary conditions of each of the boundaries of each of the grid region may include directional information with respect to the change in electric field over time, such as electric field information associated with a direction (e.g., vector information) for each of a plurality of directions (to thereby take into account various reflection and transmission angles). Such electric field information may include one or more of intensity, phase, polarization, etc., as described elsewhere herein. The second output signal (Lmt), may be a signal obtained from such analysis of the all of the plurality of grid regions (gr), and may be provided in the time domain by synthesizing the respective boundary conditions of the plurality of grid regions (gr). The second output signal (Lmt) may be obtained from the boundary conditions of an outermost boundary of the first model, such as obtained from synthesis of the electric field information associated with grid boundaries forming the outermost boundary. When the second output signal includes the transmitted wave (Lmr), the second output signal (Lmt) may be obtained by a synthesis of the boundary conditions of the bottommost boundary of the first model 20m corresponding to the bottom boundaries of the bottommost grid regions gr. When the second output signal is the reflected wave (Lmr), the second output signal may be obtained by a synthesis of the boundary conditions corresponding to the uppermost boundaries of the uppermost grid regions gr.

For example, on the first side (gra) which is the boundary between the first grid region gr1 and the second grid region gr2, a first boundary condition may be calculated. The first boundary condition may be a change in electric field over time at the boundary between the first grid region gr1 and the second grid region gr2. On the second side (grb) which is the boundary between the first grid region gr1 and the third grid region gr3, a second boundary condition may be calculated. The second boundary condition may be a change in electric field over time at the boundary between the first grid region gr1 and the third grid region gr3. On the third side (grc) which is the boundary between the first grid region gr1 and the fourth grid region gr4, a third boundary condition may be calculated. The third boundary condition may be a change in electric field over time at the boundary between the first grid region gr1 and the fourth grid region gr4. On the fourth side (grd) which is the boundary between the first grid region gr1 and the fifth grid region gr5, a fourth boundary condition may be calculated. The fourth boundary condition may be a change in electric field over time at the boundary between the first grid region gr1 and the fifth grid region gr5.

In order to calculate the first to fourth boundary conditions, for example, Maxwell's equations may be used. It may be assumed the first input signal Li is a uniform electric field that is applied to the first model 20m downwardly in the y (vertical) direction (which may be straight down or at an oblique angle to the y direction). The direction of the application of the first input signal Li may be input to the simulator and correspond to the direction of the first input signal Li applied to the measuring target (e.g., in step S110).

For one grid region of the plurality of grid regions (gr), the process of calculating the four boundary conditions may be performed for the whole of the plurality of grid regions (gr). The second output signal (Lmt) may be provided in the time domain by synthesizing all the boundary conditions of the whole of the plurality of grid regions (gr).

On the other hand, when the first model 20m corresponds to a three-dimensional image, each of the plurality of grid regions (gr) may have a shape of either a cube or a cuboid. In this case, at the boundary between each of eight grid regions being in contact with each of the plurality of grid regions (gr), a change in the electric field over time may be calculated to obtain each boundary condition of the plurality of grid regions (gr). The second output signal (Lmt), which may be is a signal determined from all of the plurality of grid regions (gr), may be provided in the time domain by synthesizing the respective boundary conditions of the plurality of grid regions (gr).

Referring to FIG. 1 again, in step (S220) of FIG. 1, the first output signal and the second output signal may be compared.

Figure 5:
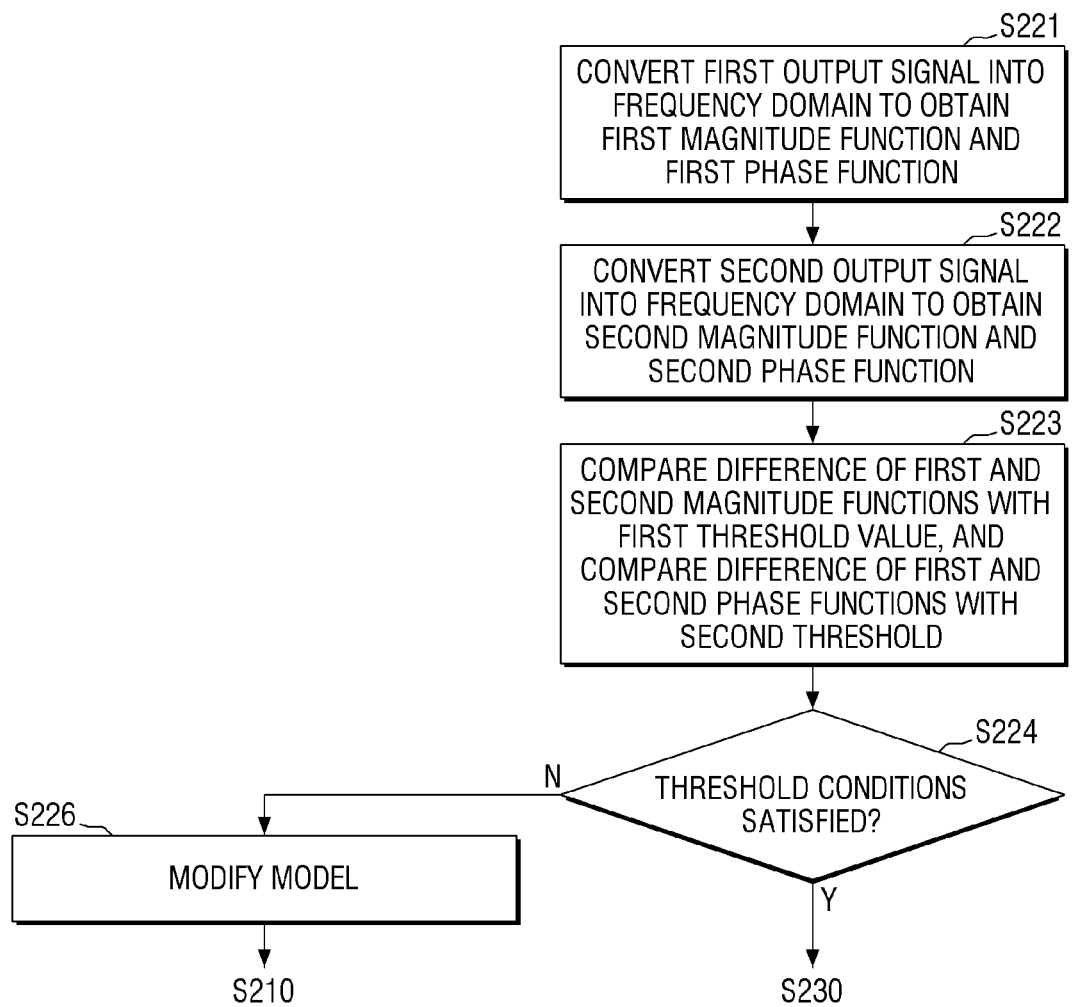
FIG. 5 is a flowchart for explaining step (S220) of FIG. 1.
Figure 6A:
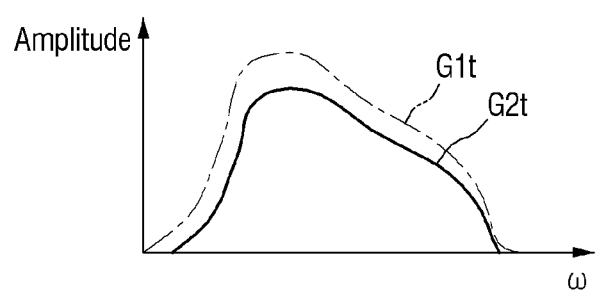
FIGS. 6A and 6B are graphs for explaining step (S220) of FIG. 1.
Figure 6B:
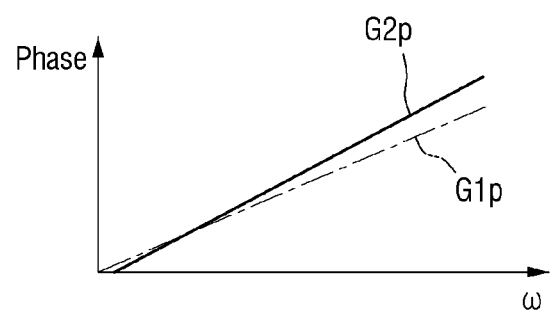

FIG. 5 is a flowchart for explaining the step (S220) of FIG. 1. FIGS. 6A and 6B are graphs for explaining the step (S220) of FIG. 1. An x-axis of FIG. 6A illustrates a frequency ω, and a y-axis may illustrate a real number value of output signal. The x-axis of 6B illustrates the frequency ω, and the y-axis may indicate a phase of the output signal.

Referring to FIG. 5, comparison of the first output signal with the second output signal in step S220 may include steps S221, S222, 5223, S224, and S226.

Referring to FIGS. 5, 6A and 6B, in step (S221) of FIG. 5, the first output signal may be converted into the frequency domain and may be represented with (i) a first function of magnitude with respect to frequency and a first function of phase with respect to frequency. For example, the first output signal (e.g., the change over time (E1o(t)) of FIG. 2B) of the first output electric field) is converted into the frequency domain, and may be provided in the form of a first magnitude function (a first function of magnitude with respect to frequency) and a first phase function (a first function of phase with respect to frequency) of the signal. In some examples, the first output signal may be represented in the frequency domain as intensity with respect to frequency, where the intensity has a real number part and imaginary number part (i.e. a first real number part function with respect to frequency and a first imaginary number part function with respect to frequency). For a particular frequency, the magnitude of an electric field has a relation such as (1) with the real number part and the imaginary number part, and the phase of an electric field may have a relation such as (2) with the real number part and the imaginary number part:

$$\text{magnitude} = \sqrt{((\text{real number part})+(\text{imaginary number part})^2))} \quad (1)$$

$$\text{phase} = \tan^{-1}(\text{imaginary number part/real number part}). \quad (2)$$

A first graph (G1t) of FIG. 6A represents the first magnitude function (magnitude of the first output signal with respect to frequency (ω)). A second graph (G1p) of FIG. 6B represents the first phase function (phase of the first output signal with respect to frequency (ω)). The first output signal may be converted into the frequency domain, using, for example, a fast Fourier transform.

In step (S222) of FIG. 5, the second output signal may be converted into the frequency domain. For example, the second output signal (e.g., (E2$o$(t) of FIG. 4) which is the change over time of the second output electric field) is converted into the frequency domain, may be calculated and provided in the form of a second magnitude function and a second phase function of the signal or a second real number part function and a second imaginary number part function. A third graph (G2$t$) of FIG. 6A represents the second magnitude function (the magnitude of the second output signal with respect to frequency ($\omega$). A fourth graph (G2$p$) of FIG. 6B represents the second phase function (the phase of the second output signal with respect to frequency ($\omega$). The second output signal may be converted into the frequency domain, for example, using a fast Fourier transform. It will be appreciated that while FIGS. 6A and 6B represent the first and second magnitude functions and first and second phase functions with continuous curves/lines, these functions may be discrete or continuous functions.

In step (S223) of FIG. 5, the first magnitude function and the second magnitude function of the signal may be compared with each other, and the first phase function and the second phase function may be compared with each other. Alternatively, the first real number part function and the second real number part function may be compared with each other, and the first imaginary number part function and the second imaginary number part function may be compared with each other.

Specifically, a difference between the first magnitude function and the second magnitude function may be compared with a first threshold value or a difference between the first real number part function and the second real number part function may be compared with a first threshold value. Such difference may correspond to a summation, for each frequency, (or an integral over a frequency range) of an absolute value of the magnitude of the first output signal and the magnitude of the second output signal (or an absolute value of the difference of the first and second real number parts). For example, the first graph (G1$t$) and the third graph (G2$t$) of FIG. 6A may be compared with each other to obtain a first value (also referenced herein as a first absolute value) corresponding to the area between the first graph (G1$t$) and the third graph (G2$t$). Also, a difference between the first phase function and the second phase function may be compared with a second threshold value or a difference between the first imaginary number part function and the second imaginary number part function may be compared with a second threshold value. Such difference may correspond to a summation, for each frequency, (or an integral over a frequency range) of an absolute value of the phase of the first output signal and the phase of the second output signal (or an absolute value of the difference of the first and second imaginary number parts). For example, the second graph (G1$p$) and the fourth graph (G2$p$) of FIG. 6B may be compared with each other to obtain a second value (also referenced herein as a second absolute value) corresponding to the area between the second graph (G1$p$) and the fourth graph (G2$p$).

It is determined whether the first absolute value is smaller than the first threshold value and the second absolute value is smaller than the second threshold in the step (S224) of FIG. 5.

If the first absolute value is smaller than the first threshold value and the second absolute value is smaller than the second threshold value in step (S224), the model is considered to represent the measuring target in the first region R1 in step (S230). Specifically, if the first absolute value is smaller than the first threshold value and the second absolute value is smaller than the second threshold value, structure and doping information of the first region (e.g., the first region R1 of FIG. 2B) of the measuring target may be estimated from the model (e.g., considered to be the same structure and doping of the model (the first model 20$m$ of FIG. 3).

Figure 7:
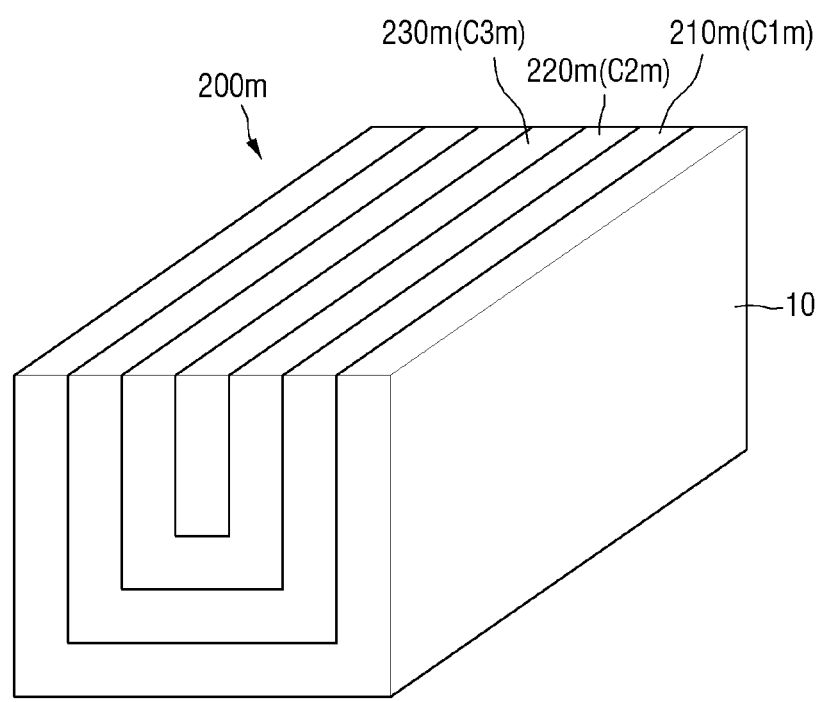
FIG. 7 is a diagram for explaining a three-dimensional model of the method for determining the doping concentration of the three-dimensional structure according to some embodiments of the present inventive concept.

FIG. 7 is a diagram for explaining a three-dimensional model 200$m$ of a method for determining a doping concentration of a three-dimensional structure according to some embodiments of the present inventive concept.

Referring to FIGS. 1, 5 and 7, in step (S230) of FIG. 1, the three-dimensional structure of the first region of the measuring target, including information on the doping concentrations of each of the plurality of layers of the measuring target, may be determined. For example, the three-dimensional structure may be estimated on the basis of the three-dimensional model 200$m$.

Specifically, the three-dimensional model 200$m$ may be estimated on the basis of a two dimensional model, such as the first model 20$m$ of FIG. 3), mapped to the first region R1 of the measuring target. The vertical cross-section of the three-dimensional model 200$m$ (perpendicular to the z direction) may be the same as the first model 20$m$ of FIG. 3.

For example, the three-dimensional model 200$m$ may include information on the structure of a plurality of three-dimensional modeling layers 210$m$, 220$m$ and 230$m$ and information C1$m$, C2$m$ and C3$m$ on the doping concentrations of each of the plurality of three-dimensional modeling layers 210$m$, 220$m$ and 230$m$. The three-dimensional model 200$m$ may include information on the structure of the first region of the measuring target and the doping concentrations of each of the plurality of layers in the first region. The measuring target may be estimated to have the structure shown by the three-dimensional model 200$m$ and the doping concentrations of each of the plurality of layers.

Referring again to FIG. 5, in step (S224), it may be determined whether the first absolute value is smaller than the first threshold value and the second absolute value is smaller than the second threshold.

If the first absolute value is greater than the first threshold value or the second absolute value is greater than the second threshold value, in step (S226), the model is modified and may be returned to the step (S210) of FIG. 1.

Specifically, if the first absolute value is greater than the first threshold value or the second absolute value is greater than the second threshold value, a modified model is generated in which at least one of structural information of the previous model or information on the doping concentration of the previous model is modified. The process returns to step (S210) of FIG. 1 to obtain a new second output signal using the first input signal as an input value with respect to simulations using the modified model. The process of performing steps (S210) and (S220) may be repeated until a model is obtained that satisfies the threshold conditions of step (S224) of FIG. 5 to then perform step (S230)

Referring to FIGS. 3 and 5, if the first absolute value is greater than the first threshold, the modified model (e.g., the modification of first model 20$m$) may be utilized to generate a second model which includes the structural information of the plurality of second modeling layers. The structural information of the plurality of second modeling layers may be different from the structural information of the plurality of first modeling layers 21$m$, 22$m$ and 23$m$.

If the second absolute value is greater than the second threshold value, the modification information of the first model 20$m$ may be utilized to generate a third model which includes information on the modified doping concentrations of each of the plurality of first modeling layers 21*m*, 22*m* and 23*m*. Information on the modified doping concentrations of each of the plurality of first modeling layers 21*m*, 22*m* and 23*m* may be different from the information C1*m*, C2*m* and C2*m* of each of the plurality of first modeling layers 21*m*, 22*m* and 23*m*.

If the first absolute value is greater than the first threshold value and the second absolute value is greater than the second threshold value, the modification information of the first model 20*m* may be utilized to generate a fourth model which includes structural information of the plurality of second modeling layers and the information on the doping concentrations of each of the plurality of second modeling layers. Information on the doping concentrations of each of the plurality of second modeling layers may differ from the information C1*m*, C2*m* and C3*m* on the doping concentrations of each of the plurality of first modeling layers 21*m*, 22*m* and 23*m*.

Referring again to FIG. 5, after the modified models (for example, second, third and fourth models) are generated in step (S226), in the model modified in step (S210), the first input signal is set as an input value, and the output signal may be provided in the time domain. For the modified model, the steps subsequent to step (S210) may be executed.

Hereinafter, a method for determining a doping concentration of a three-dimensional structure according to some embodiments of the present inventive concept will be described with reference to FIGS. 8 and 9. For the sake of clarity of explanation, repetition of the aforementioned description may be avoided.

Figure 8:
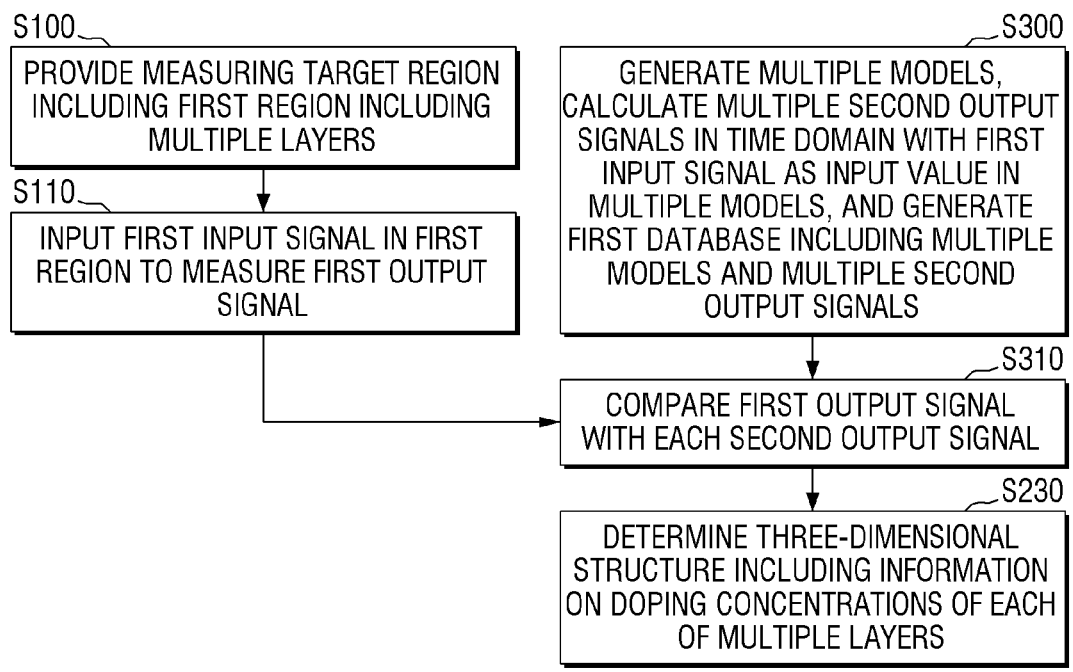
FIG. 8 is a flowchart illustrating the method for determining the doping concentration of the three-dimensional structure according to some embodiments of the present inventive concept.

FIG. 8 is a flowchart illustrating the method for determining the doping concentration of the three-dimensional structure according to some embodiments of the present inventive concept. FIG. 9 is a flowchart for explaining the step S310 of FIG. 8.

Referring to FIG. 8, a database may be generated in step (S300). Specifically, first, a plurality of models may be generated. In each of the plurality of models, at least one of structural information of the plurality of modeling layers and information on the doping concentrations of each of the plurality of modeling layers may be different from each other. Each of the plurality of models may correspond to a different version (e.g., different structure and/or doping) of the models described herein, such as a two-dimensional model (such as described with respect to model 20*m*) or a three-dimensional model (such as described with respect to model 200*m*).

A first input signal is input as an input value to each of the plurality of models, and a plurality of second output signals may be calculated, respectively. Each of the plurality of second output signals may be provided in the time domain.

The plurality of generated models and the plurality of calculated second output signals may be stored in a database. The plurality of second output signals may be stored in the database, for example, as a function of the time domain, or may be converted into the frequency domain and stored in the database.

In step S310, the first output signal and each of the plurality of second output signals may be compared with each other. Each such comparison may comprise a comparison as described with respect to step (S220) of FIG. 1.

Figure 9:
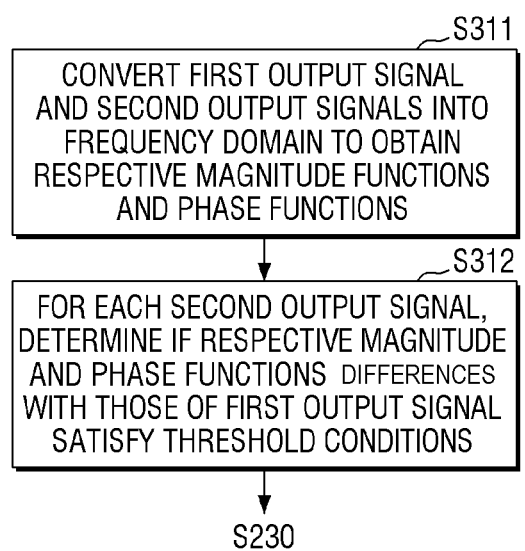
FIG. 9 is a flowchart for explaining step (S310) of FIG. 8.

The step (S310) of FIG. 8 may include steps (S311 and S312) of FIG. 9.

Referring to FIG. 9, in step (S311) of FIG. 9, the first output signal is converted into a frequency domain, and a first magnitude function, a first phase function (and/or a first real number part function and a first imaginary number part function). Similarly, each second output signal may be converted into the frequency to main to obtain a corresponding second magnitude function and a second phase function (and/or a second real number part function and a second imaginary number part function). Such functions may be obtained as described elsewhere herein, such as with respect to FIGS. 6A and 6B.

In step (S312) of FIG. 9, the magnitude function of each of the plurality of second output signals and the first magnitude function may be compared with each other, and the phase function of each of the plurality of second output signals and the first phase function may be compared with each other. Alternatively or in addition, the real number part functions of each of the plurality of second output signals may be compared with the first imaginary number part function, and the imaginary number part functions of each of the plurality of second output signals may be compared with the first imaginary number function. At this time, when any of the plurality of second output signals satisfies the threshold conditions described with respect to step S224 of FIG. 5, the corresponding model(s) from which these second output signal(s) were generated in step S300 may be considered as a model representing the measuring target (and more specifically, as representing the target region of the measuring target), such as described with respect to step S230 of FIG. 5. If more than one second output signal satisfies the threshold conditions described with respect to step S224 of FIG. 5, the model corresponding to the second output signal resulting in the smallest first and second absolute values may be selected as representing the measuring target. Such smallest first and second absolute values may be evaluated as a sum of the first and second absolute values or a sum of weighted first and second absolute values.

If none of the plurality of second output signals corresponding to the models generated in step (S300) satisfies the threshold conditions described with respect to step S224 of FIG. 5, none of the models generated in step (S300) may be considered as a model representing the measuring target, and a new model may be generated. For example, the new model may be a modified model may be generated as described with respect to step (S226) of FIG. 5. This modified model may correspond to a modification of a model generated in step (S300) having the smallest first and second absolute values (e.g., which may be evaluated based on a sum or weighted sum as described above). The modified model may be a model not included in the multiple models generated in step (S300). The process may proceed to step (S210) as described with respect to FIGS. 1 and 5 and repeated to generate a plurality of modified models (each different from each other and different from the multiple models previously stored in the database in step (S300)), until a modified model is obtained satisfying the threshold conditions of step S224. Specifically, each modified model(s) may be used to generate a second output signal based upon the first input signal with respect to the modified model as part of a simulation, as described with respect to step (S210) which is then in the comparison step (S220) (e.g., as describe with respect to FIG. 5). If the threshold conditions of step (S224) are satisfied (e.g., with respect to the calculated first and second absolute values), such modified model may be considered to represent the measuring target as described with respect to step (S230). The database may be updated by storing each modified model that may be generated in this process and the corresponding second output signal generated from simulations using the corresponding modified model and the first input signal.

Here, each of the second output signals of the multiple models generated in step (S300) and the modified model(s) may be one or both of a transmitted wave obtained by simulating the passage of the first input signal through the model and a reflected wave obtained by simulating the reflection of the first input signal from the model. Each of the second output signals may be represented as and/or include information of a change over time of an output electric field (e.g., Lmt and/or Lmr as described elsewhere herein).

Thereafter, in step (S230) of FIG. 1, the three-dimensional structure of the first region of the measuring target may be estimated on the basis of the model corresponding to the second output signals that meet the threshold conditions of step (S224), which model may be either previously generated and stored in the database in step (S300) or a newly generated modified model generated via step (S226).

Hereinafter, a method of manufacturing a semiconductor device according to some embodiments of the present inventive concept will be described with reference to FIGS. 10, 11A, and 11B. For the sake of clarity of explanation, repeated parts of the aforementioned description may be omitted.

Figure 10:
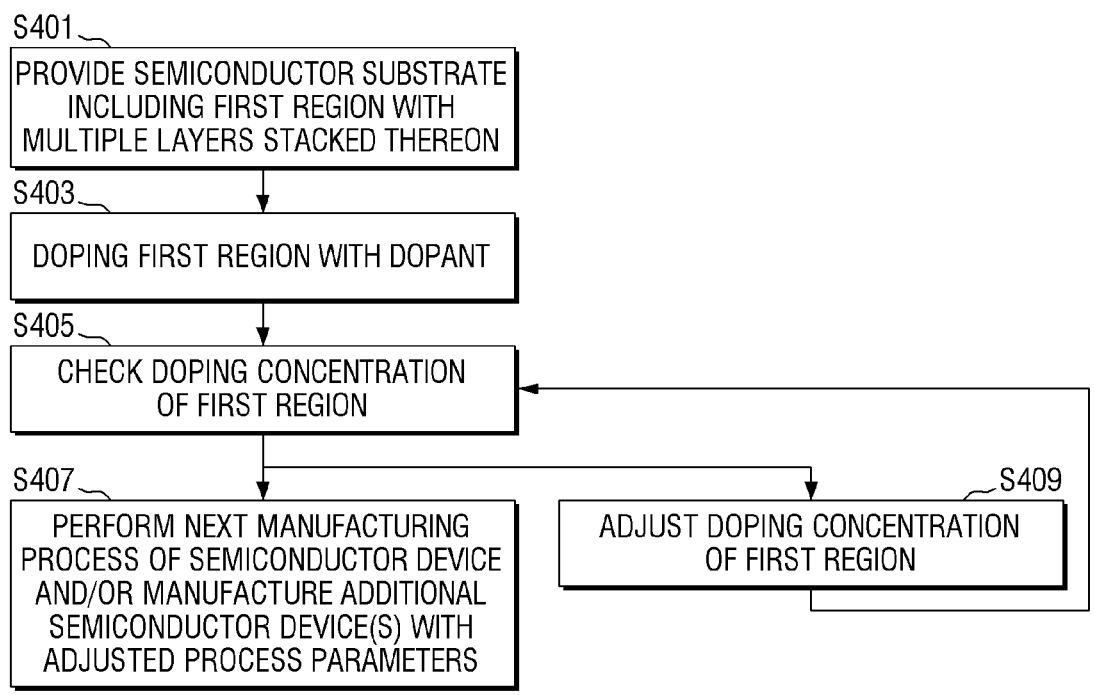
FIG. 10 is a flowchart illustrating a method of manufacturing a semiconductor device according to some embodiments of the present inventive concept.

FIG. 10 is a flowchart illustrating a method of manufacturing a semiconductor device. The method of manufacturing may include a method for determining the doping concentration of the three-dimensional structure according to some embodiments of the present inventive concept, as described herein. Each of FIGS. 11A and 11B is a cross-sectional view taken along the line A-A' of FIG. 2B.

Figure 11A:
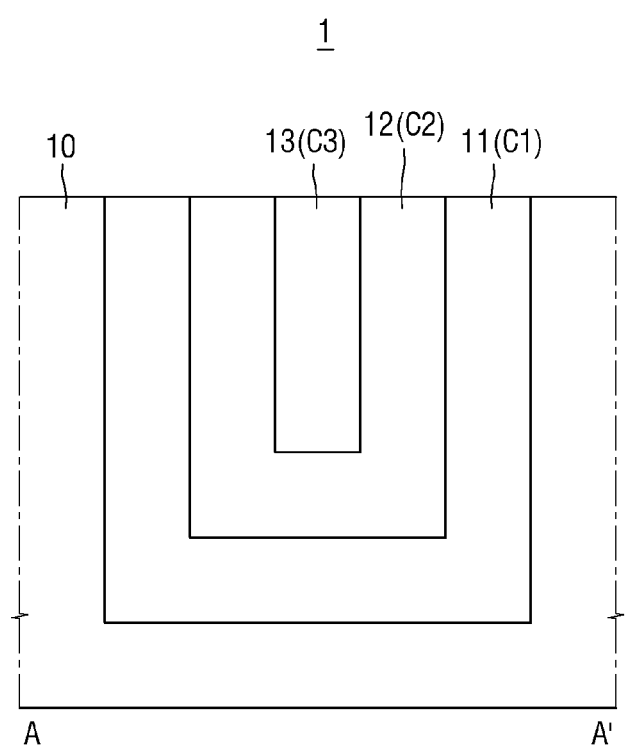
FIGS. 11A and 11B are cross-sectional views taken along the line A-A' of FIG. 2B, respectively.
Figure 11B:
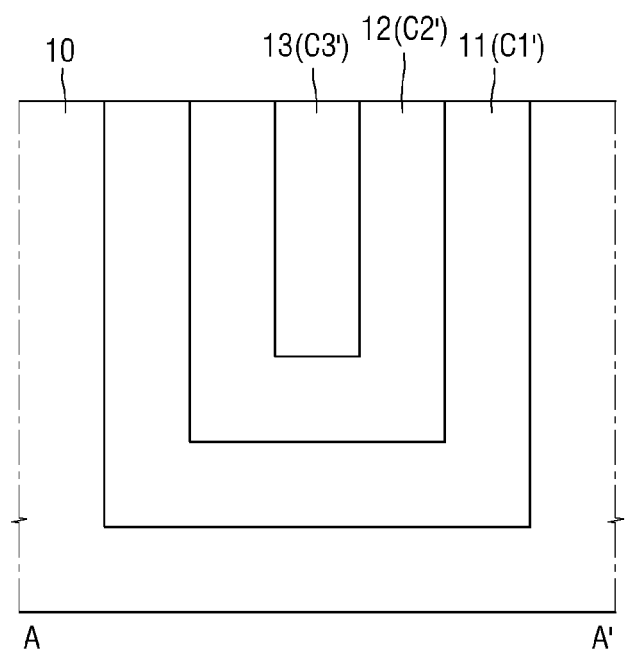

Referring to FIGS. 10, 11A and 11B, in step (S401), a semiconductor substrate 1 including a first region on which a plurality of layers 11, 12 and 13 are stacked may be provided.

In step (S403), the first region on which the plurality of layers 11, 12 and 13 are stacked may be doped with a charge carrier impurity (e.g., dopant of a first conductivity type (e.g., an N-type) or a second conductivity type (e.g., a P-type)). Each of the first layer 11, the second layer 12 and the third layer 13 may have each of a first doping concentration C1, a second doping concentration C2 and a third doping concentration C3.

In step (S405), the doping concentration of the first region of the semiconductor substrate 1 may be checked. Checking of the doping concentration of the first region of the semiconductor substrate 1 may be performed, using a method of determining the doping concentration of the three-dimensional structure as described with reference to FIGS. 1 to 7 and/or FIGS. 8 to 9. Specifically, the semiconductor substrate 1 may correspond to the measuring target (e.g., measuring target 10) as described herein which is subjected to a first input signal to measure a first output signal (e.g., as described with respect to step (S110)). The doping concentration and structure (e.g., a three-dimensional doping profile) of a region R1 of the semiconductor substrate 1 may be estimated to be that of a model (e.g., 20m, 200m) corresponding to a second output signal meeting the threshold conditions of step (S224).

As a result of checking the doping concentration of the first region of the semiconductor substrate 1, if the doping concentration coincides with an ideal structure of the first region R1 (e.g., the doping concentrations and structure of each of the plurality of layers coincides with an ideal structure), in step (S407), subsequent manufacturing processes of the semiconductor device may be continued. As one example, the semiconductor device 1 may be subjected to further semiconductor processing steps to form patterned insulating layer and patterned conductive layers thereon, to thereby form a plurality of integrated circuit devices from a wafer (including the semiconductor substrate 1), from which a plurality of semiconductor IC chips, including the semiconductor device, are formed (which may be cut, or singulated, from the wafer).

As a result of checking the doping concentration in the first region of the semiconductor substrate 1, if the doping concentration and/or structure information does not coincide with the ideal concentration/structure of the first region (e.g., if the doping concentration and/or structure information does not correspond to an acceptable doping profile of the first region), a new semiconductor substrate 2 may be prepared with different semiconductor manufacturing process conditions (e.g., doping precursor amounts, time of doping process, heat, chamber electrode voltages, etc. of a doping process, such as ion implantation or in-situ epitaxial doping processes). In step (S409), the new semiconductor substrate 2 may be a new measuring target and include a first region R1 as described herein having the doping concentrations and/or structure of one or more of the plurality of layers of the first region adjusted as compared to that of the semiconductor substrate 1.

For example, each of the first layer 11, the second layer 12 and the third layer 13 of the new semiconductor substrate 2 may be adjusted to have each of a fourth doping concentration C1', a fifth doping concentration C2' and a sixth doping concentration C3', respectively.

The step of checking the doping concentration in the first region of step (S405) may be executed again on the new semiconductor substrate 2 in which the doping concentration in the first region of the semiconductor substrate 2 is adjusted (as compared to the first region of the semiconductor substrate 1) based on checking the doping concentration in the first region of the semiconductor substrate 1. This step of checking may correspond to estimating the doping and structure of the layers of the semiconductor substrate 2, as described herein. This process of checking (S405) and adjusting (S409) may be performed until a semiconductor substrate having the ideal doping concentrations and structure (e.g., within an acceptable deviation with respect to the layers in region R1) is obtained. The semiconductor manufacturing process conditions (e.g., doping precursor amounts, time of doping process, heat, chamber electrode voltages, etc. of a doping process) used to obtain the semiconductor substrate having the ideal doping concentrations and structure may be used to manufacture additional semiconductor devices (e.g., which may be formed with a semiconductor substrate with the ideal doping concentration and structure).

In some examples, the semiconductor substrate 2 may be an actual modification of the semiconductor substrate 1 having additional dopants added thereto and/or heat treatment to modify the doping profile of the semiconductor substrate 1. For example, measurements of the doping profile of the semiconductor substrate 1 may be performed in-situ (without removing the semiconductor substrate 1 being doped) in a chamber performing the doping process to determine when proper doping of the semiconductor substrate has been achieved.

Hereinafter, a computing system including a program for determining the doping concentration of the three-dimensional structure according to some embodiments of the present inventive concept will be described referring to FIG. 12. For the sake of clarity of explanation, repeated part of the aforementioned description will not be described.

Figure 12:
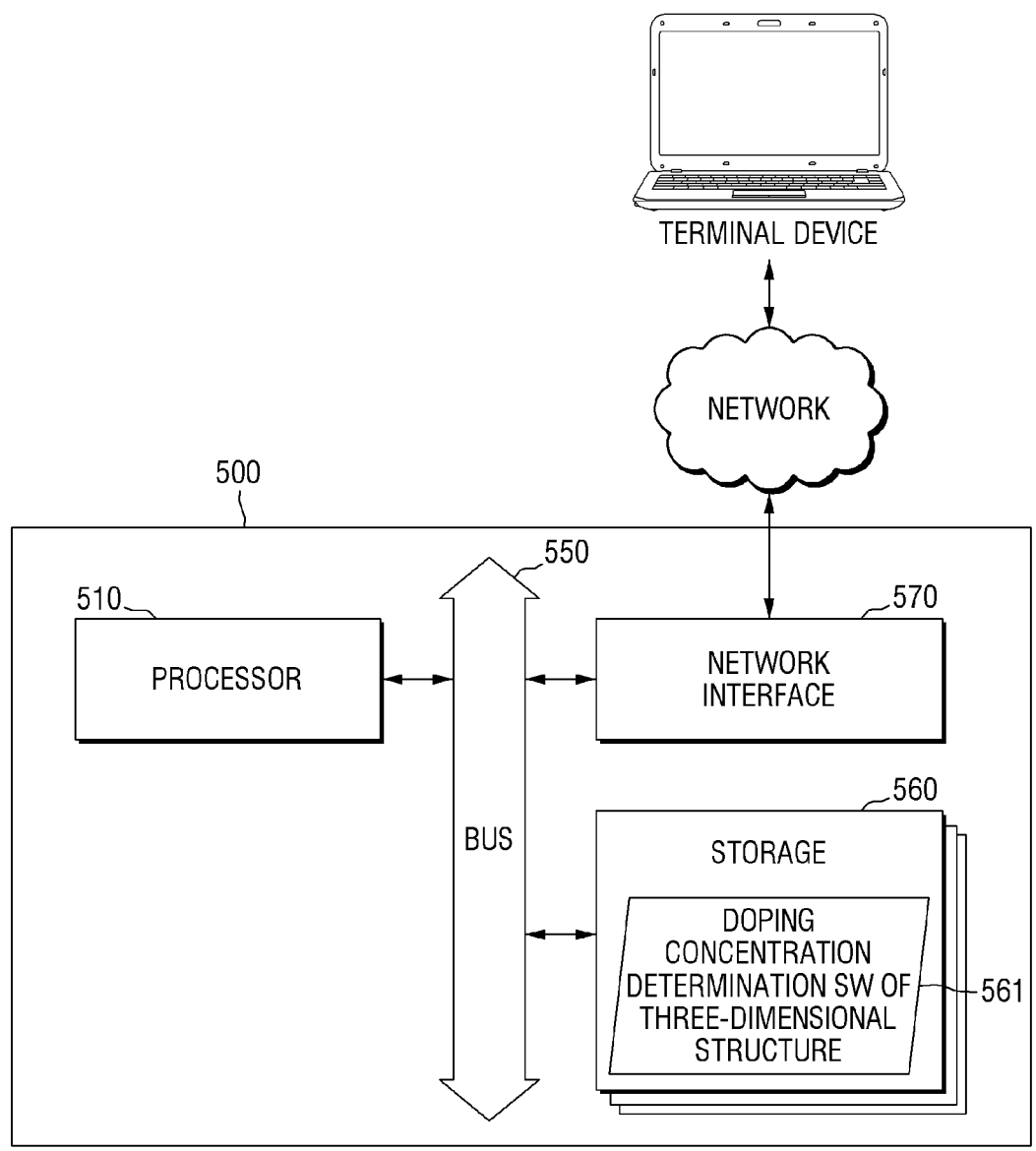
FIG. 12 is a diagram illustrating a computing system including a program for determining the doping concentration of the three-dimensional structure according to some embodiments of the present inventive concept.

FIG. 12 is a diagram illustrating a computer configured with a program for determining the doping concentration of the three-dimensional structure according to some embodiments of the present inventive concept.

Referring to FIG. 12, a computer 500 may include a processor 510, a network interface 570 and a storage 560. The computer 500 may include a system bus 550 connected to the processor 510 to communicate data between the processor 510, network interface 570 and storage 560. Computer 500 is one example of a simulator that may perform steps of the simulations described herein.

A terminal device which is another computer may be connected to the network interface 570 via a network. For example, the terminal device that is another computer connected to the network interface 570 may be a display device, a user terminal, or the like. The network interface 570 may be Ethernet, FireWire, USB or the like.

The storage 560 may be implemented as, for example, a non-volatile memory device such as a flash memory or a hard disk. The storage 560 may store a doping concentration determining program 561 of the three-dimensional structure. The doping concentration determining program 561 of the three-dimensional structure may include a binary execution file and other resource files.

Further, the storage 560 may include a database including a plurality of models and a plurality of second output signals, as described with reference to FIGS. 8 and 9. The database may be generated and updated, for example, by the doping concentration determining program 561 of the three-dimensional structure.

The processor 510 may execute, for example, the doping concentration determining program 561 of the three-dimensional structure. However, the processor 510 may be capable of executing other programs besides the doping concentration determining program 561 of the three-dimensional structure. For example, the processor 510 may be a general purpose processor and the computer may be a general purpose computer.

The doping concentration determining program 561 of the three-dimensional structure when executed causes the processor 510 to perform the steps of the methods described herein, including model generation and simulations using such models.

Further, the doping concentration determining program 561 of the three-dimensional structure may provide the output signal in the time domain, using the plurality of grid regions described with reference to FIGS. 4A and 4B.

The output signal provided in the time domain may be, for example, one of the second output signal and the third output signal described above with reference to FIGS. 1 to 7, 8 to 9, and 10 to 11B. The external input value may be, for example, the first output signal described above with reference to FIGS. 1 to 7, 8 to 9, and 10 to 11B.

The user may cause execution of the method for determining the doping concentration of the three-dimensional structure according to the present inventive concept, in the manner of downloading and storing or executing the doping concentration determining program 561 of the three-dimensional structure stored in the storage 560 from the terminal device through the network.

According to a software implementation, examples such as procedures or functions may be implemented together with another software module that makes at least one function or operation. The software code may be implemented by a software application written in the appropriate programming language.

While the present inventive concept has been particularly shown and described with reference to exemplary embodiments thereof, it will be understood by those of ordinary skill in the art that various changes in form and details may be made therein without departing from the spirit and scope of the present inventive concept as defined by the following claims. It is therefore desired that the present embodiments be considered in all respects as illustrative and not restrictive, reference being made to the appended claims rather than the foregoing description to indicate the scope of the invention.

What is claimed is:

1. A method of manufacturing a semiconductor device, the method comprising:
   providing a measuring target including a first region having a plurality of layers;
   inputting a first input signal, which is a change over time of a first input electric field, into the measuring target, and measuring a first output signal which is a change over time of a first output electric field transmitted through or reflected by the first region;
   providing a first model including first structural information of a plurality of first modeling layers and information of doping concentrations of each of the plurality of first modeling layers;
   obtaining a second output signal, which estimates a change over time of a second output electric field transmitted through or reflected by the first model, with the first input signal as an input value to the first model;
   comparing the first output signal with the second output signal to obtain a comparison value;
   determining the first model represents the first region of the measuring target in response to the comparison value being smaller than a threshold value; and
   estimating a three-dimensional structure of the plurality of layers of the measuring target on the basis of the first model,
   wherein the three-dimensional structure of the plurality of layers is estimated from a three-dimensional model, wherein the three-dimensional model is the first model or derived from the first model and includes information on doping concentrations of each of the plurality of layers.

2. The method of manufacturing a semiconductor device of claim 1,
   wherein the first model is divided into a plurality of grid regions, and
   wherein the obtaining of the second output signal includes:
      calculating a change in electric field over time at boundaries of each of the plurality of grid regions to obtain boundary conditions of each of the plurality of grid regions, and
      synthesizing the boundary conditions of each of the plurality of grid regions to calculate the second output signal.

3. The method of manufacturing a semiconductor device of claim 2, wherein the plurality of grid regions include first, second, third, fourth and fifth grid regions,
   the first grid region includes first, second, third and fourth sides,
   the second grid region is in contact with the first side of the first grid region,
   the third grid region is in contact with the second side of the first grid region,
   the fourth grid region is in contact with the third side of the first grid region,
   the fifth grid region is in contact with the fourth side of the first grid region, and obtaining of the boundary conditions of each of the plurality of grid regions includes calculating a first boundary condition which is a change in electric field over time at a boundary between the first grid region and the second grid region, calculating a second boundary condition which is a change in electric field over time at a boundary between the first grid region and the third grid region, calculating a third boundary condition which is a change in electric field over time at the boundary between the first grid region and the fourth grid region, and calculating a fourth boundary condition which is a change in electric field over time at a boundary between the first grid region and the fifth grid region.

4. The method of manufacturing a semiconductor device of claim 1, further comprising:
generating a database including a plurality of models and a plurality of third output signals, each third output signal representing changes over time of an output electric field that is estimated as being transmitted through or reflected by a corresponding one of the plurality of models, with the first input signal as an input value,
wherein each of the plurality of models includes structural information of a plurality of modeling layers and information on doping concentrations of each of the plurality of modeling layers, and
wherein for each of the plurality of models, at least one of the structural information and the information on doping concentration is different from each of the other ones of the plurality of models.

5. The method of manufacturing a semiconductor device of claim 4, further comprising:
comparing each of the plurality of third output signals stored in the database with the first output signal.

6. The method of manufacturing a semiconductor device of claim 5, further comprising:
when each result of comparing each of the plurality of third output signals with the first output signal is greater than the threshold value,
generating a modified model which is not included in the database;
simulating the input of the first input signal into the modified model to provide a fourth output signal which represents a change over time of a resulting output electric field transmitted through or reflected by the modified model in the time domain; and
adding the modified model and the fourth output signal to the database to update the database,
wherein the modified model includes structural information of a plurality of modeling layers and information of the doping concentrations of each of the plurality of modeling layers.

7. The method of manufacturing a semiconductor device of claim 1, further comprising:
providing a second model including second structural information of a plurality of second modeling layers and information on doping concentrations of each of the plurality of second modeling layers;
providing a third output signal in the time domain, the third output signal representing the change over time of an electric field transmitted through or reflected by the second model when the second model is subject to the first input signal as an input value; and
comparing the first output signal with the third output signal.

8. The method of manufacturing a semiconductor device of claim 1,
wherein the threshold value includes a first threshold value and a second threshold value,
wherein determining the first model represents the first region of the measuring target in response to the comparison value being smaller than the threshold value comprises:
converting the first output signal into the frequency domain to obtain a first function of a first type and a first function of a second type;
converting the second output signal into the frequency domain to obtain a second function of the first type and a second function of the second type;
comparing a first difference with the first threshold value, the first difference being a difference between the first function of the first type and the second function of the second type;
comparing a second difference with the second threshold value, the second difference being a difference between the first function of the second type and the second function of the second type; and
determining the first model represents the measuring target when the first difference is smaller than the first threshold value and the second difference is less than the second threshold value,
wherein the first and second functions of the first type represent one of a magnitude of corresponding electric fields with respect to frequency and a real number part of the corresponding electric fields with respect to frequency, and
wherein the first and second functions of the second type represent one of a phase of the corresponding electric fields and an imaginary number part of the corresponding electric fields.

9. A method of manufacturing a semiconductor device, comprising:
providing a first semiconductor substrate including a first region having a plurality of layers having different doping concentrations;
checking a doping profile of the first region of the first semiconductor substrate; and
manufacturing the semiconductor device including a second semiconductor substrate having a doping profile of a corresponding first region of the second semiconductor substrate determined in response to checking the doping profile of the first region of the first semiconductor substrate,
wherein the checking of the doping profile of the first region of the first semiconductor substrate includes:
providing the first semiconductor substrate as a measuring target;
inputting a first input signal, which is a change over time of a first input electric field, into the measuring target, and measuring a first output signal which is a change over time of a first output electric field transmitted through or reflected by the first region of the first semiconductor substrate;
providing a first model including first structural information of a plurality of first modeling layers and information of doping concentrations of each of the plurality of first modeling layers;
obtaining a second output signal, which estimates a change over time of a second output electric field transmitted through or reflected by the first model, with the first input signal as an input value to the first model;

comparing the first output signal with the second output signal to obtain a comparison value;

determining the first model represents the first region of the measuring target in response to the comparison value being smaller than a threshold value; and estimating a three-dimensional structure of the plurality of layers of the measuring target on the basis of the first model, wherein the three-dimensional structure of the plurality of layers is estimated from a three-dimensional model, and wherein the three-dimensional model is the first model or derived from the first model and includes information on doping concentrations of each of the plurality of layers.

10. The method of manufacturing the semiconductor device of claim 9, further comprising:

in response to the estimated three-dimensional structure of the plurality of layers of the measuring target are determined to outside of a desired range, adjusting the doping concentration of the corresponding first region of the second semiconductor substrate.

11. The method of manufacturing the semiconductor device of claim 9, wherein the first model includes a plurality of grid regions, and wherein the obtaining of the second output signal in the time domain includes:

calculating a change in electric field over time at boundaries of each of the plurality of grid regions to obtain boundary conditions of each of the plurality of grid regions, and synthesizing the boundary conditions of each of the plurality of grid regions to provide the second output signal.

12. The method of manufacturing the semiconductor device of claim 11, wherein the plurality of grid regions include first, second, third, fourth and fifth grid regions, the first grid region includes first, second, third and fourth sides, the second grid region is in contact with the first side of the first grid region, the third grid region is in contact with the second side of the first grid region, the fourth grid region is in contact with the third side of the first grid region, the fifth grid region is in contact with the fourth side of the first grid region, and obtaining of the boundary conditions of each of the plurality of grid regions includes:

calculating a first boundary condition which is a change in electric field over time at a boundary between the first grid region and the second grid region, calculating a second boundary condition which is a change in electric field over time at a boundary between the first grid region and the third grid region, calculating a third boundary condition which is a change in electric field over time at a boundary between the first grid region and the fourth grid region, and calculating a fourth boundary condition which is a change in electric field over time at a boundary between the first grid region and the fifth grid region.

13. The method of manufacturing the semiconductor device of claim 9, further comprising:

generating a database including a plurality of models and a plurality of third output signals, each third output signal representing changes over time of an output electric field that is estimated as being transmitted through or reflected by a corresponding one of the plurality of models, with the first input signal as an input value, wherein each of the plurality of models includes structural information of a plurality of modeling layers and information on doping concentrations of each of the plurality of modeling layers, and wherein in each of the plurality of models, at least one of the structural information and the information on doping concentration is different from each of the other ones of the plurality of models.

14. The method of manufacturing the semiconductor device of claim 13, further comprising:

comparing each of the plurality of third output signals stored in the database with the first output signal.

15. The method of manufacturing the semiconductor device of claim 14, further comprising:

when each result of comparing each of the plurality of third output signals with the first output signal is greater than the threshold value, generating a modified model which is not included in the database;

simulating the input of the first input signal into the modified model to provide a corresponding fourth output signal which represents a change over time of a resulting output electric field transmitted through or reflected by the modified model in the time domain; and adding the modified model and the corresponding fourth output signal to the database to update the database, wherein the modified model includes structural information of a plurality of modeling layers and information of the doping concentrations of each of the plurality of modeling layers.

16. The method of manufacturing the semiconductor device of claim 9, further comprising:

obtaining a third output signal which estimates a third output electric field that changes over time that is transmitted through our reflected by a second model, with the first input signal as an input value into a second model, the second model including second structural information of a plurality of second modeling layers and information on doping concentrations of each of the plurality of second modeling layers; and comparing the first output signal with the third output signal.

17. The method of manufacturing the semiconductor device of claim 9, wherein the threshold value includes a first threshold value and a second threshold value, wherein determining the first model represents the first region of the measuring target in response to the comparison value being smaller than the threshold value comprises:

converting the first output signal into the frequency domain to obtain a first function of a first type and a first function of a second type;

converting the second output signal into the frequency domain to obtain a second function of the first type and a second function of the second type;

comparing a first difference with the first threshold value, the first difference being a difference between the first function of the first type and the second function of the second type;

comparing a second difference with the second threshold value, the second difference being a difference between the first function of the second type and the second function of the second type; and determining the first model represents the measuring target when the first difference is smaller than the first threshold value and the second difference is less than the second threshold value, wherein the first and second functions of the first type represent one of a magnitude of corresponding electric fields with respect to frequency and a real number part of the corresponding electric fields with respect to frequency, and wherein the first and second functions of the second type represent one of a phase of the corresponding electric fields and an imaginary number part of the corresponding electric fields.

* * * * *